(12) United States Patent
Nishikawa

(10) Patent No.: US 8,888,214 B2
(45) Date of Patent: Nov. 18, 2014

(54) IMAGE FORMING APPARATUS AND IMAGE FORMING METHOD

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/812,492

(22) PCT Filed: Aug. 12, 2011

(86) PCT No.: PCT/JP2011/068724
§ 371 (c)(1),
(2), (4) Date: Jan. 25, 2013

(87) PCT Pub. No.: WO2012/026394
PCT Pub. Date: Mar. 1, 2012

(65) Prior Publication Data
US 2013/0120482 A1      May 16, 2013

(30) Foreign Application Priority Data

Aug. 25, 2010    (JP) ................. 2010-188754

(51) Int. Cl.
*B41J 29/38*    (2006.01)
*H04N 1/52*    (2006.01)
*B41J 2/21*    (2006.01)

(52) U.S. Cl.
CPC ............ *B41J 2/2121* (2013.01); *H04N 1/52* (2013.01); *B41J 2/2114* (2013.01)
USPC .................. 347/9; 347/14; 347/98; 347/100

(58) Field of Classification Search
CPC ............................. B41J 2/2121; B41J 2/2114
USPC .................. 347/5, 9, 14, 19, 95, 98, 100
See application file for complete search history.

(56) References Cited

U.S. PATENT DOCUMENTS 6,857,733 B2 * 2/2005 Issler ....................... 347/100
6,923,523 B2   8/2005 Nishikawa et al.
(Continued)

FOREIGN PATENT DOCUMENTS

CN    101563233 A    10/2009
CN    101780731 A    7/2010
(Continued)

OTHER PUBLICATIONS

U.S. Appl. No. 13/676,054, filed Nov. 13, 2012.
(Continued)

*Primary Examiner* — Juanita D Jackson
(74) *Attorney, Agent, or Firm* — Fitzpatrick, Cella, Harper & Scinto

(57) ABSTRACT

This invention enhances gloss uniformity of a formed image surface by selectively using colorless inks according to dot layouts of colored inks. A dot-layout unit sets colored dot layouts for respective colors of colored ink data. A colorless-dot-layout unit sets a colorless dot layout for one colorless ink with reference to a colorless dot layout table according to the colored ink data. An image is formed according to the colored and colorless dot layouts. In the colorless dot layout table, when a specular glossiness calculated according to the colored dot layouts is high, the colorless dot layout is set to superpose a colorless ink having a low refractive index on a colored ink having a high refractive index. Conversely, when the specular glossiness is low, the colorless dot layout is set to superpose a colorless ink having a high refractive index on a colored ink having a low refractive index.

13 Claims, 11 Drawing Sheets

(56) References Cited

U.S. PATENT DOCUMENTS

| | | | |
|---|---|---|---|
| 7,032,989 B2 | 4/2006 | Nishikawa | |
| 7,381,756 B2 * | 6/2008 | Kato et al. | 347/100 |
| 7,443,536 B2 | 10/2008 | Takahashi | |
| 7,697,177 B2 | 4/2010 | Nishikawa | |
| 7,843,599 B2 | 11/2010 | Nishikawa et al. | |
| 7,978,385 B2 | 7/2011 | Nishikawa | |
| 8,142,860 B2 | 3/2012 | Vanmaele et al. | |
| 8,270,048 B2 | 9/2012 | Nishikawa | |
| 8,376,502 B2 | 2/2013 | Ochiai et al. | |
| 8,493,622 B2 | 7/2013 | Yoshida | |
| 8,702,224 B2 | 4/2014 | Ohnishi | |
| 2004/0017406 A1 | 1/2004 | Kato et al. | |
| 2004/0021885 A1 | 2/2004 | Nishikawa | |
| 2006/0115147 A1 | 6/2006 | Nishikawa | |
| 2007/0030505 A1 | 2/2007 | Ito et al. | |
| 2007/0043488 A1 | 2/2007 | Avery et al. | |
| 2007/0146753 A1 | 6/2007 | Nishikawa | |
| 2007/0211100 A1 | 9/2007 | Mizutani et al. | |
| 2009/0195601 A1 | 8/2009 | Billow et al. | |
| 2009/0244168 A1 | 10/2009 | Kakutani | |
| 2009/0244248 A1 | 10/2009 | Nakano et al. | |
| 2011/0242556 A1 | 10/2011 | Jinno et al. | |

FOREIGN PATENT DOCUMENTS

| | | |
|---|---|---|
| EP | 2078613 A2 | 7/2009 |
| JP | 2004-195920 A | 7/2004 |
| JP | 2004-310355 A | 11/2004 |
| JP | 2005-059362 A | 3/2005 |
| JP | 2005-193463 A | 7/2005 |
| JP | 3-963444 B2 | 8/2007 |
| JP | 3963444 B2 | 8/2007 |
| JP | 2009-012261 A | 1/2009 |
| JP | 2010-195002 A | 9/2010 |

OTHER PUBLICATIONS

"Specular Glossiness—Methods of Measurement." JIS Z8741, 1997.
"Colour Specification—The CIE 1931 Standard Colorimetric System and the CIE 1964 Supplementary Standard Colorimetric System" JIS Z8701, 1999.
"Standard Illuminants and Sources for Colorimetry" —JIS Z8720, 2012.
International Search Report for Int'l Appl No. PCT/JP2011/068724, dated Nov. 8, 2011.
Chinese Office Action dated Jul. 21, 2014 from counterpart Chinese Application No. 201180041218.6.

* cited by examiner

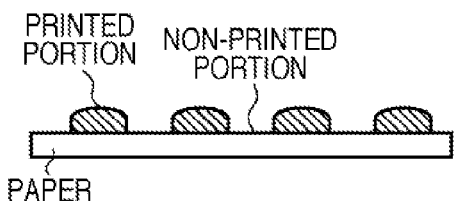
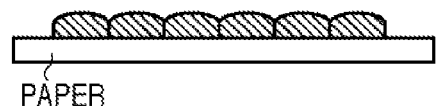
FIG. 1A    FIG. 1B
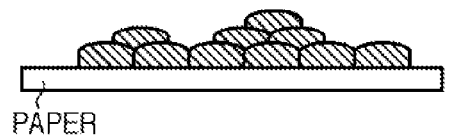
FIG. 1C
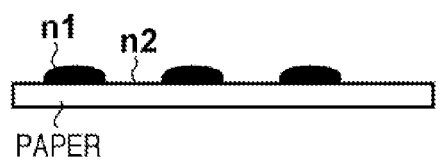
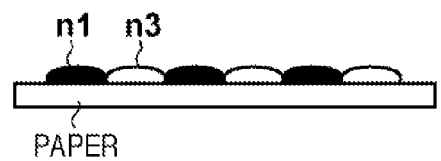
FIG. 2A    FIG. 2B
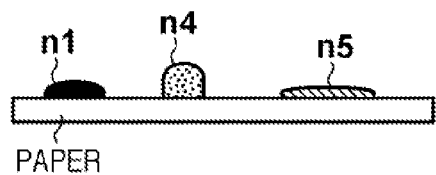
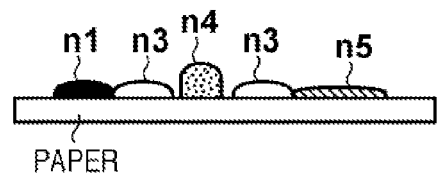
FIG. 2C    FIG. 2D F I G. 6
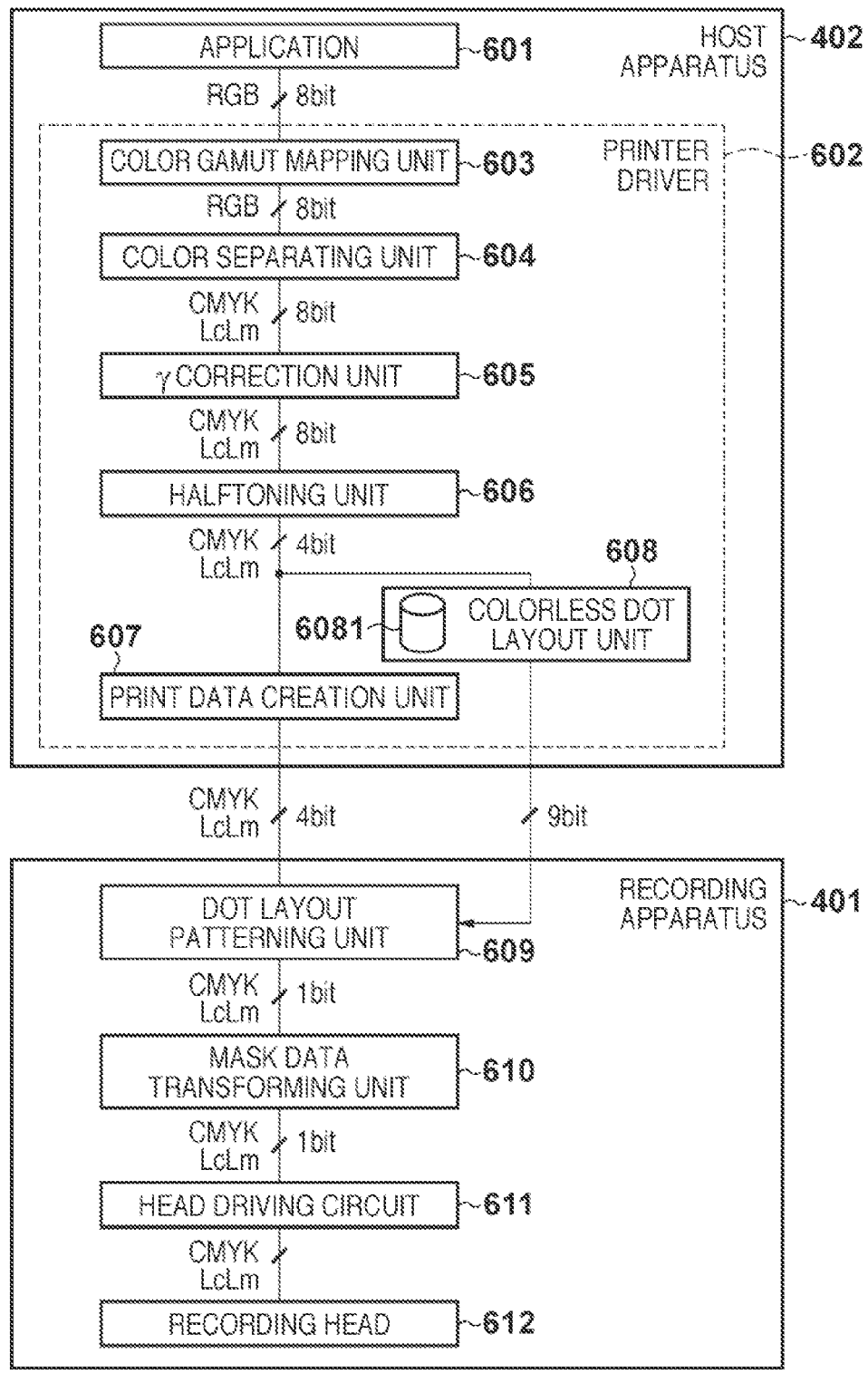

|  | MASS (%) |
|---|---|
| GLYCERIN | 10 |
| ETHYLENE GLYCOL | 5 |
| TRIETHYLENE GLYCOL | 5 |
| ACETHYLENOL E100 | 1 |
| PURE WATER | RESIDUE |

SOLVENT

FIG. 11

|  | POLYMER A | POLYMER B |
|---|---|---|
| STYRENE (WT%) | 60 | 20 |
| n-BUTYL ACRYLATE (WT%) | 20 | 60 |
| ACRYLIC ACID (WT%) | 20 | 20 |
| ACID NUMBER | 156mgKOH/g | 156mgKOH/g |
| MOLECULAR WEIGHT Mw | 10000 | 10000 |

POLYMER COMPOSITIONS OF DIFFERENT REFRACTIVE INDICES

|  | POLYMER C | POLYMER D |
|---|---|---|
| STYRENE (WT%) | 30 | 30 |
| n-BUTYL ACRYLATE (WT%) | 33 | 43 |
| ACRYLIC ACID (WT%) | 37 | 27 |
| ACID NUMBER | 288mgKOH/g | 210mgKOH/g |
| MOLECULAR WEIGHT Mw | 10000 | 10000 |

POLYMER COMPOSITIONS OF DIFFERENT PERMEABILITIES

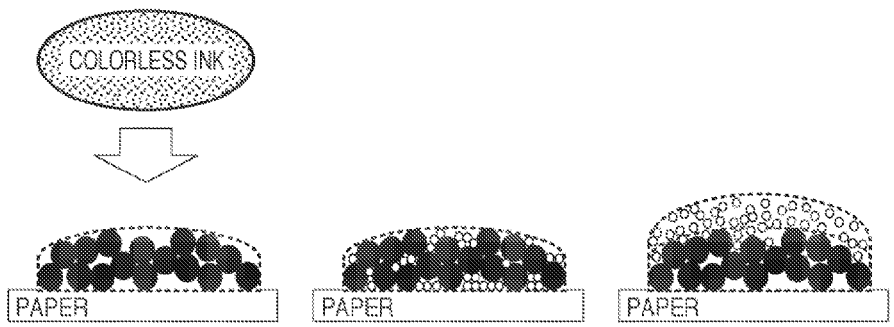
F I G. 14A   F I G. 14B   F I G. 14C
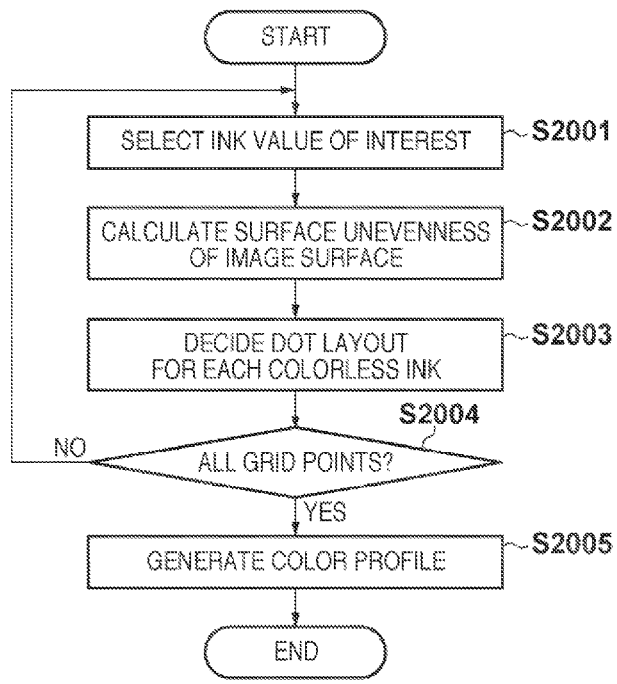
F I G. 15

F I G. 16
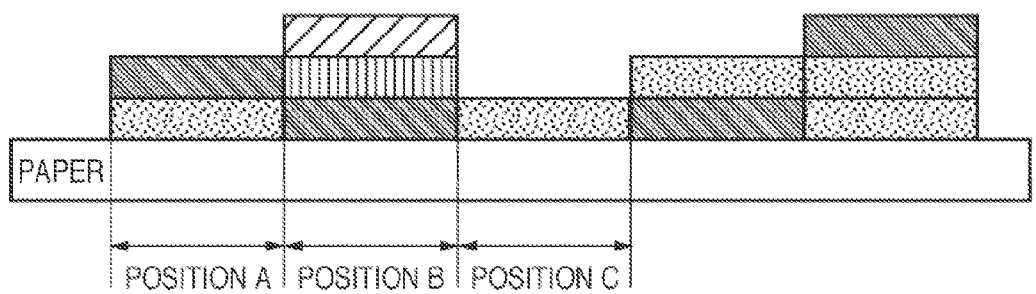

IMAGE FORMING APPARATUS AND IMAGE FORMING METHOD

TECHNICAL FIELD

The present invention relates to an image forming apparatus and image forming method for forming a color image using colored inks containing pigment color materials and a colorless ink.

BACKGROUND ART

Reference Literature

Literature 1: Japanese Patent No. 3963444
Literature 2: Japanese Patent Laid-Open No. 2007-043488
Literature 3: Specular glossiness measurement method (JIS Z 8741)
Literature 4: Standard light for measurement and standard illuminant (JIS Z 8720)
Literature 5: Color display method—XYZ colorimetric system and X10Y10Z10 colorimetric system (JIS Z 8701)

In recent years, use of pigment inks containing pigment color materials has prevailed in ink-jet printers. As is well known, color materials for pigment inks perform poorly in permeating a recording medium. For this reason, an image formed using a pigment ink includes non-printed portions and printed portions, as shown in FIG. 1A. Furthermore, even on the printed portion, a portion where a small amount of the color material is used (FIG. 1B) and a portion where a large amount of the color material is used (FIG. 1C) are generated. Therefore, uneven portions are formed on the surface of the recording medium depending on the amount of the color material, thus generating nonuniformity in gloss.

In general, the intensity of a gloss changes depending on a refractive index and surface shape of a material, and the gloss becomes higher as the refractive index is higher and the surface shape is smoother. The smoothness of the surface shape can be measured based on a degree of blurring of a reflected image. Since the degree of blurring of this regular reflected image is expressed by an index called an image clarity, one feels glossy from two factors, that is, the intensity of regular reflected light (corresponding to a specular glossiness described in literature 3) and the image clarity. That is, the gloss is expressed by two factors, that is, the specular glossiness influenced by the refractive index and surface shape of an image surface, and clarity (degree of blurring) which changes depending on the surface shape.

As a method for eliminating gloss nonuniformity of an image formed on a recording medium, for example, an ink which contains a transparent and colorless material may be incorporated in a printer, and may be ejected onto an image simultaneously with inks containing color materials represented by C, M, Y, and K color materials. A transparent and colorless ink will be referred to as a colorless ink, and inks containing color materials will be referred to as colored inks hereinafter. In the arrangement using the colorless ink, the gloss of an image is controlled by controlling the smoothness of the image surface and the refractive indices of inks which exist on the image uppermost face and strongly influence a regular reflection, without influencing the colors of an image.

FIGS. 2A to 2D show an example of eliminating gloss nonuniformity using the colorless ink. FIG. 2A is an image sectional view when an image is formed on a recording medium having a refractive index $n2$ using only a colored ink (indicated by black portions in FIG. 2A) having a refractive index $n1$. FIG. 2B shows an image section when an image is formed to lay out colorless ink portions (indicated by white portions in FIG. 2B) having a refractive index $n3$ between the colored ink portions as those in FIG. 2A. Note that since the colorless ink does not influence a color, no color difference is generated between the two images shown in FIGS. 2A and 2B. In this case, when an image is formed using only the colored ink, as shown in FIG. 2A, for example, since ink dots exist sparsely in case of, for example, a halftone image, the recording medium surface and ink surface have a level difference due to the deposition properties of a pigment color material on a surface. Such level nonuniformity provokes irregular reflections of light on the recording medium surface, resulting, especially, in poor image clarity of gloss properties. On the other hand, in the image shown in FIG. 2B, which uses the colorless ink, since the recording medium surface is covered by the colorless ink, the surface unevenness is eliminated compared to the image shown in FIG. 2A, thus improving the image clarity. Furthermore, in general, the above refractive indices normally satisfy the relationship "recording medium ($n2$)<colorless ink ($n3$)<colored ink ($n1$)". Therefore, since a refractive index difference ($n1-n3$) in the image shown in FIG. 2B is smaller than a refractive index difference ($n1-n2$) in the image shown in FIG. 2A, the former image can suppress nonuniformity of, especially, the specular glossiness of the gloss properties, and the specular glossiness can be higher as a whole.

Note that since deposition amounts and refractive indices of inks of pigment particles on a paper surface are different depending on types of pigment inks, glosses are different depending on the ink types. FIG. 2C shows an example in which a plurality of types of colored inks having different properties exist together on a recording medium. Dots shown in FIG. 2C are respectively formed by inks having different refractive indices $n1$, $n4$, and $n5$. Also, independently of refractive indices, the levels and shapes at the time of deposition vary depending on solid contents of color materials and polymers in pigment inks. Gloss differences in this case will be described below with reference to FIG. 3. In FIG. 3, the abscissa plots an ink amount injected onto a paper surface, and the ordinate plots a specular glossiness. Referring to FIG. 3, reference numeral 301 denotes a specular glossiness curve of a primary color gradation using a certain ink. Reference numerals 302 and 303 denote specular glossiness curves of primary color gradations using inks having refractive indices lower than that of the ink of the curve 301. As can be seen from FIG. 3, the specular glossinesses of the curves 302 and 303 are lower than that of the curve 301.

As described above, even when the gloss control is made using the colorless ink as in the related arts, when colored inks have nonuniform glosses (uneven shapes and refractive indices at the time of superposition), as shown in FIG. 2C, it is difficult to enhance gloss uniformity using one type of colorless ink. For example, FIG. 2D shows an example in which colorless ink dots are laid out between neighboring dots of the colored inks shown in FIG. 2C. In this case, the refractive index differences between the colored and colorless inks are sparse like $n1-n3$, $n4-n3$, and $n5-n3$, and the colored inks have nonuniform dot levels. Hence, the entire image cannot have a uniform gloss.

SUMMARY OF INVENTION

Therefore, the present invention provides a technique to enhance a gloss uniformity of a formed image surface by selectively using colorless inks depending on a dot layout of colored inks in an image forming apparatus which uses a plurality of colors of colored inks containing pigment color materials, and a plurality of types of colorless inks having different refractive indices.

To solve the above problem, according to first aspect of the invention, there is provided an image forming apparatus, which forms an image using a plurality of colors of colored inks which contain pigment color materials and have different refractive indices, and a plurality of types of colorless inks which contain colorless materials and have different refractive indices, comprising: a color separating means for acquiring colored ink data for respective colors of the colored inks by color separation processing for each pixel of input color image data; a colored dot layout means for setting, for each pixel, colored dot layouts of the respective colors of the colored inks according to tone levels of the respective colors indicated by the colored ink data; a colorless dot layout means for setting, for each pixel, a colorless dot layout for one of the plurality of types of colorless inks with reference to a colorless dot layout table using the colored ink data as indices; and an image forming means for forming a color image on a recording medium by recording, for each pixel, the respective colored inks in the colored dot layouts, and the colorless ink set by the colorless dot layout means of the plurality of types of colorless inks in the colorless dot layout, wherein in the colorless dot layout table, when a specular glossiness calculated according to the colored dot layouts for the colored ink data is higher than a predetermined target value, the colorless dot layout is set to superpose a colorless ink having a lowest refractive index on a colored ink having a highest refractive index, and when the specular glossiness is not more than the target value, the colorless dot layout is set to superpose a colorless ink having a highest refractive index on a colored ink having a lowest refractive index or on a recording medium exposed portion where none of colored ink dots are laid out.

According to second aspect of the invention, there is provided an image forming apparatus, which forms an image using a plurality of colors of colored inks which contain pigment color materials, and a plurality of types of colorless inks having different permeabilities, comprising: a color separating means for acquiring colored ink data for respective colors of the colored inks by color separation processing for each pixel of input color image data; a colored dot layout means for setting, for each pixel, colored dot layouts of the respective colors of the colored inks according to tone levels of the respective colors indicated by the colored ink data; a colorless dot layout means for setting, for each pixel, a colorless dot layout for each of the plurality of types of colorless inks with reference to a colorless dot layout table using the colored ink data as indices; and an image forming means for forming a color image on a recording medium by recording, for each pixel, the respective colored inks in the colored dot layouts, and the colorless ink set by the colorless dot layout means of the plurality of types of colorless inks in the colorless dot layout, wherein in the colorless dot layout table, a colored ink dot deposition amount on a recording medium surface is calculated according to the colored dot layouts for the colored ink data, and the colorless dot layout is set to superpose a colorless ink having a highest permeability on a portion where the deposition amount is larger than a predetermined threshold, and to superpose a colorless ink having a lowest permeability on a portion where the deposition amount is not more than the threshold.

According to third aspect of the invention, there is provided an image forming method in an image forming apparatus, which forms an image using a plurality of colors of colored inks which contain pigment color materials and have different refractive indices, and a plurality of types of colorless inks which contain colorless materials and have different refractive indices, comprising: a color separating step of acquiring colored ink data for respective colors of the colored inks by color separation processing for each pixel of input color image data; a colored dot layout step of setting, for each pixel, colored dot layouts of the respective colors of the colored inks according to tone levels of the respective colors indicated by the colored ink data; a colorless dot layout step of setting, for each pixel, a colorless dot layout for one of the plurality of types of colorless inks with reference to a colorless dot layout table using the colored ink data as indices; and an image forming step of forming a color image on a recording medium by recording, for each pixel, the respective colored inks in the colored dot layouts, and the colorless ink set in the colorless dot layout step of the plurality of types of colorless inks in the colorless dot layout, wherein in the colorless dot layout table, when a specular glossiness calculated according to the colored dot layouts for the colored ink data is higher than a predetermined target value, the colorless dot layout is set to superpose a colorless ink having a lowest refractive index on a colored ink having a highest refractive index, and when the specular glossiness is not more than the target value, the colorless dot layout is set to superpose a colorless ink having a highest refractive index on a colored ink having a lowest refractive index or on a recording medium exposed portion where none of colored ink dots are laid out.

According to fourth aspect of the invention, there is provided an image forming method in an image forming apparatus, which forms an image using a plurality of colors of colored inks which contain pigment color materials, and a plurality of types of colorless inks having different permeabilities, comprising: a color separating step of acquiring colored ink data for respective colors of the colored inks by color separation processing for each pixel of input color image data; a colored dot layout step of setting, for each pixel, colored dot layouts of the respective colors of the colored inks according to tone levels of the respective colors indicated by the colored ink data; a colorless dot layout step of setting, for each pixel, a colorless dot layout for each of the plurality of types of colorless inks with reference to a colorless dot layout table using the colored ink data as indices; and an image forming step of forming a color image on a recording medium by recording, for each pixel, the respective colored inks in the colored dot layouts, and the colorless ink set in the colorless dot layout step of the plurality of types of colorless inks in the colorless dot layout, wherein in the colorless dot layout table, a colored ink dot deposition amount on a recording medium surface is calculated according to the colored dot layouts for the colored ink data, and the colorless dot layout is set to superpose a colorless ink having a highest permeability on a portion where the deposition amount is larger than a predetermined threshold, and to superpose a colorless ink having a lowest permeability on a portion where the deposition amount is not more than the threshold.

According to fifth aspect of the invention, there is provided an image forming apparatus wherein a gloss corresponding to colored ink data is acquired for each pixel, when the acquired gloss is higher than a predetermined target value, a colorless ink having a lower refractive index of a plurality of types of colorless inks is used in the pixel, and when the gloss is not more than the target value, a colorless ink having a higher refractive index is used in the pixel.

According to sixth aspect of the invention, there is provided a control method of an image forming apparatus, comprising the steps of: acquiring a gloss corresponding to colored ink data for each pixel; using, when the acquired gloss is higher than a predetermined target value, a colorless ink having a lower refractive index of a plurality of types of colorless inks in the pixel; and using, when the gloss is not more than the target value, a colorless ink having a higher refractive index in the pixel.

According to seventh aspect of the invention, there is provided an image forming apparatus, which forms an image using a plurality of colors of colored inks which contain pigment color materials and a plurality of types of colorless inks which contain colorless materials and have different refractive indices, comprising: acquisition means for acquiring, for each pixel in inputted image data, colored ink data for each colored inks; acquisition means for acquiring a glossiness corresponding to the colored ink data; forming means for forming an image represented by the inputted image data using, among the plurality of types of colorless inks, a colorless ink having a lower refractive index if the glossiness of the pixel is higher than a predetermined target value, and a colorless ink having a higher refractive index if the glossiness of the pixel is not higher than the predetermined target value.

According to eighth aspect of the invention, there is provided an image forming method in an image forming apparatus, which forms an image using a plurality of colors of colored inks which contain pigment color materials and a plurality of types of colorless inks which contain colorless materials and have different refractive indices, comprising: an acquiring step of acquiring, for each pixel in inputted image data, colored ink data for each colored inks; an acquiring step of acquiring a glossiness corresponding to the colored ink data; an forming step of forming an image represented by the inputted image data using, among the plurality of types of colorless inks, a colorless ink having a lower refractive index if the glossiness of the pixel is higher than a predetermined target value, and a colorless ink having a higher refractive index if the glossiness of the pixel is not higher than the predetermined target value.

The present invention can enhance the gloss uniformity of a formed image surface by selectively using colorless inks depending on the dot layout of colored inks in an image forming apparatus which uses a plurality of colors of colored inks containing pigment color materials, and a plurality of types of colorless inks having different refractive indices.

Further features of the present invention will become apparent from the following description of exemplary embodiments (with reference to the attached drawings).

BRIEF DESCRIPTION OF DRAWINGS

FIGS. 1A to 1C are views showing different fixed states of a pigment ink;

FIGS. 2A to 2D are views showing image forming examples using a transparent and colorless ink in addition to a colored ink;

FIG. 6 is a block diagram showing the principal functional arrangement according to the first embodiment;

FIG. 8 shows dot layout pattern examples according to the first embodiment;

FIG. 10 is a table showing an example of a transparent and colorless ink solvent composition according to the first embodiment;

FIG. 11 is a table showing examples of transparent and colorless ink polymer compositions according to the first embodiment;

FIGS. 14A to 14C are views showing landing state differences of a colorless ink according to the second embodiment;

FIG. 15 is a flowchart showing creation processing of a transparent and colorless dot layout table according to the second embodiment; and FIG. 16 is a view showing an example of a surface unevenness due to landing of colored inks according to the second embodiment.

DESCRIPTION OF EMBODIMENTS

Embodiments of the present invention will be described hereinafter with reference to the drawings. Note that the following embodiments do not limit the present invention related to the scope of the claims, and all of combinations of features described in the embodiments are not essential to solving means of the present invention.

First Embodiment

System Arrangement

This embodiment will exemplify a case in which one of a plurality of types of transparent and colorless inks (to be simply referred to as colorless inks hereinafter), which contain transparent and colorless materials and have different refractive indices, is superposed on an image formed using a plurality of colors of colored inks which contain pigment color materials and have different refractive indices, thereby enhancing the gloss uniformity of the image. A case will be exemplified below wherein two different types of colorless inks having different refractive indices are used.

Figure 3:
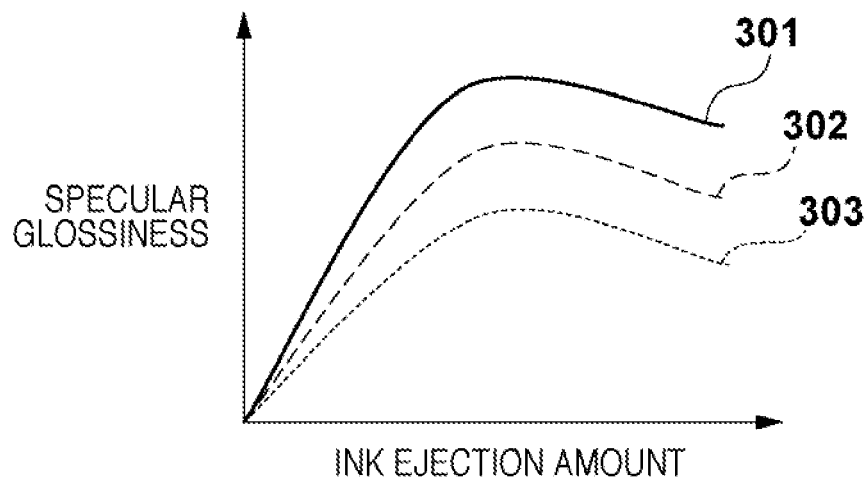
FIG. 3 is a graph showing gloss differences of colored inks.
Figure 4:
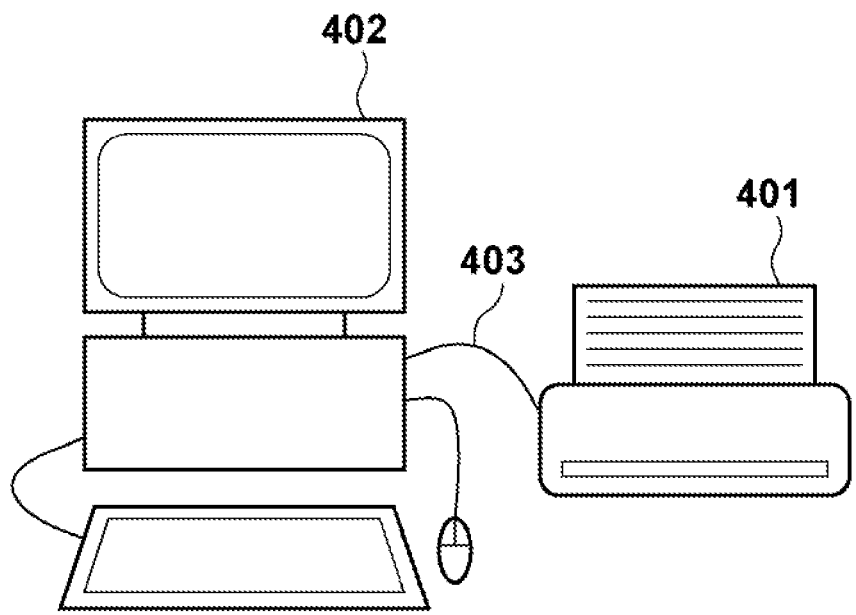
FIG. 4 is a view showing the outer appearance of an image forming system according to the first embodiment.

FIG. 4 shows the outer appearance of an image forming system according to this embodiment. Referring to FIG. 4, reference numeral 401 denotes a color printer; 402, a computer system which serves as both a printer controller and a client computer; and 403, a connector cable represented by a network cable, SCSI cable, and USB cable.

Figure 5:
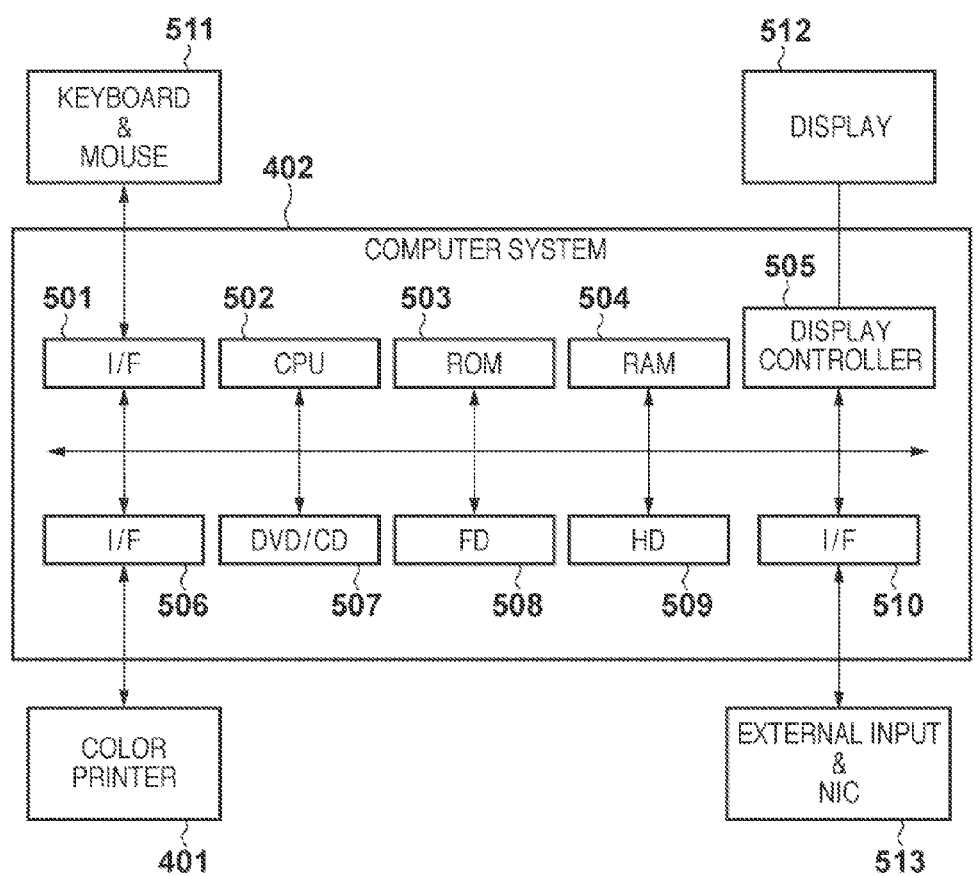
FIG. 5 is a block diagram showing the principal hardware arrangement of a computer system according to the first embodiment.

FIG. 5 is a block diagram showing the principal hardware arrangement in the computer system 402 shown in FIG. 4. Referring to FIG. 5, reference numeral 501 denotes an interface (I/F) which connects a keyboard and mouse 511 used by the user to input various manual instructions, and the computer system 402. Reference numeral 502 denotes a CPU which controls the operations of respective blocks in the computer system 402, or can execute internally stored programs. Reference numeral 503 denotes a ROM which prestores, for example, required image processing programs, and the like. Reference numeral 504 denotes a RAM which temporarily stores programs and image data to be processed so as to allow the CPU 502 to execute processing. Reference numeral 505 denotes a display controller required to control a display 512, which displays an image to be processed and messages to the user. Reference numeral 506 denotes an interface (I/F) which connects the computer system 402 and color printer 401. Reference numeral 507 denotes a CD drive which can load data stored in a Compact Disc (including a CD-R, CD-RW, DVD, DVD-R, DVD-RW, etc.) as one of external storage media, or can write out data to that disk. Reference numeral 508 denotes an FD drive which can load or write out data from or to a Floppy® disk (FD) as in the CD drive 507. When image editing programs or printer information and the like are stored in the CD, FD, DVD, or the like, these programs can be installed on a hard disk (HD) 509, and can be transferred onto the RAM 504 as needed. The HD 509 can pre-store programs and image data to be transferred to, for example, the RAM 504, and can save processed image data. Reference numeral 510 denotes an interface (I/F) which connects the computer system 402, and a transmission device 513 such as a model and network card, which transmit various data held at respective locations of the computer system 402 to an external apparatus, and receive various data from the external apparatus.

Functional Arrangement

FIG. 6 is a block diagram showing the principal functional arrangement in the image forming system shown in FIG. 4. The color printer 401 of this embodiment performs a print operation using a plurality of colors of colored inks which contain pigment color materials, and a plurality of types of colorless inks which contain transparent and colorless materials and have different refractive indices, and uses a recording head which ejects inks for this purpose. As shown in FIGS. 4 and 6, the image forming system of this embodiment is configured by including the color printer (to be referred to as "printer" hereinafter) 401 using these pigment inks, and the personal computer (PC) 402 serving as a host apparatus or image processing apparatus.

Programs which run on an operating system of the PC 402 include an application 601 and printer driver 602. The application 601 executes processing for creating image data to be printed by the printer 401. This image data or data before edit processing or the like of that image data can be fetched into the PC 402 via various media. The PC 402 of this embodiment can fetch, for example, image data of a JPEG format, which is captured by a digital camera, from the external input 513 such as a flash memory via the I/F 510. Also, the PC 402 can fetch image data stored in, for example, the HD 509 or CD-ROM 507. Furthermore, the PC 402 can fetch data on a Web from the Internet via the NIC 513. These fetched data undergo edit and modification processes via the application 601 displayed on the display 512, thus creating, for example, image data R, G, and B of the sRGB standard. Then, these image data are passed to the printer driver 602 in response to, for example, a print instruction from the user.

The printer driver 602 of this embodiment has a color gamut mapping unit 603, color separating unit 604, γ correction unit 605, halftoning unit 606, print data creation unit 607, and colorless dot layout unit 608. This embodiment is characterized in that the colorless dot layout unit 608 sets an ink type and dot layout information of the colorless ink to be used in accordance with a dot layout of colored inks.

The color gamut mapping unit 603 includes a three-dimensional LUT which has, as its contents, the relationship for mapping a gamut reproduced by color image data R, G, and B of the sRGB standard within a gamut reproduced by the printer 401 so as to attain gamut mapping. Using interpolation calculations together with this LUT, data transforms that transform 8-bit image data R, G, and B into data R, G, and B within the gamut of the printer 401 are implemented.

The color separating unit 604 executes processing for calculating color separated data such as data C, M, Y, K, Lc, and Lm, which correspond to a combination of inks required to reproduce a color represented by the gamut-mapped data R, G, and B based on these data. These color separated data will be referred to as colored ink data hereinafter. The color separating unit 604 includes a three-dimensional LUT for color separation as in the color gamut mapping unit 603, and implements color separation processing using interpolation calculations together with this color separation LUT. Note that the color separation LUT can be prepared by calculating a color reproduction range that can be reproduced by, for example, combinations of the colored inks and printer from colorimetric values of patches. However, its preparation method is not particularly limited.

The γ correction unit 605 performs tone value transformation processing of each color of the colored ink data calculated by the color separating unit 604. More specifically, the γ correction unit 605 performs transformation processing which linearly associates the colored ink data with tone characteristics of the printer 401 using a linear LUT according to the tone characteristics of color inks of the printer 401. The halftoning unit 606 executes quantization processing for transforming, for example, each of 8-bit colored ink data C, M, Y, K, Lc, and Lm into 4-bit data. In this embodiment, error diffusion processing is used as this quantization processing. Note that this embodiment will explain the colored inks of six colors C, M, Y, K, Lc, and Lm. However, the present invention is not limited to such specific example. Of course, the present invention is feasible if four colors C, M, Y, and K are used or, for example, R, G, and B inks or light K ink are included. The 4-bit data after quantization are used as indices indicating a layout pattern of colored dots in dot layout pattern processing to be described later. Lastly, the print data creation unit 607 creates print data by adding print control information to print image data having the 4-bit index data as contents, and this print data is output to the printer 401.

The colorless dot layout unit 608 assigns a type of a colorless ink to be ejected onto an uppermost face at the time of image formation, and pattern information indicating a dot layout pattern of the colorless ink, using the 4-bit data of the colored inks output from the halftoning unit 606 as indices. This assignment uses an LUT 6081, and details of a creation method of the LUT will be described later. A type (1 bit) of a colorless ink and dot layout pattern information (8 bits), which are assigned by this unit, are directly output to the printer 401 as print data (9 bit) for the colorless ink.

Note that processes of the application 601 and printer driver 602 in the aforementioned PC 402 are executed by the CPU 502 according to these programs. In this case, the programs are read out from the ROM 503 or HD 509 when they are used, and the RAM 504 is used as a work area upon execution of the processing.

Note that in this embodiment, a minimum unit of image processing for multi-valued data expressed by a plurality of bits will be referred to as a pixel, and data corresponding to the pixel will be referred to as pixel data. Note that image processing for multi-valued data expressed by a plurality of bits includes, for example, color separating processing for transforming 8-bit data R, G, and B into 8-bit data C, M, Y, K, Lc, and Lm corresponding to ink colors used in the printer 401 in the color separating unit 604. Also, such image processing includes halftoning processing for quantizing the 8-bit data C, M, Y, K, Lc, and Lm into 4-bit data. From another point of view, "pixel" is a minimum unit that allows a tone expression, and has a tone level information of a plurality of bits.

The printer 401 executes data processing using a dot layout patterning unit 609 and mask data transforming unit 610. The dot layout patterning unit 609 receives print data associated with the colored inks from the print data creation unit 607, and also print data associated with the colorless ink from the colorless dot layout unit 608.

The dot layout patterning unit 609 lays out colored dots according to a corresponding dot layout pattern based on the 4-bit index data (tone level information) as print image data associated with the colored inks for each pixel corresponding to a print image. In this manner, by assigning a colored dot layout pattern corresponding to a tone level of each pixel expressed by 4-bit data to that pixel, ON/OFF states of dots are defined in a plurality of areas in the pixel. Note that this colored dot layout is performed for each color of the colored inks. Thus, ejection data "1" or "0" is laid out for each area in one pixel in association with each color of the colored inks.

Next, colorless dots are laid out according to a corresponding dot layout pattern for each of the plurality of types of colorless inks as in the colored inks using the 9-bit print data as an index. Thus, ejection data "1" or "0" is laid out for each area in one pixel in association with each colorless ink.

One-bit ejection data of respective colors including the colorless ink, which are created by the dot layout patterning unit 609, undergo mask processing by the mask data transforming unit 610. That is, the mask data transforming unit 610 generates ejection data of respective scans required to complete recording of a scan region having a predetermined width by a recording head 612 by a plurality of scans by processing using masks corresponding to respective scans. Ejection data Y, M, C, K, Lc, and Lm for each scan are sent to a head driving circuit 611 at an appropriate timing, and the recording head 612 is driven by the head driving circuit 611 to eject respective inks according to the ejection data, thereby forming a color image on a recording medium. Assume that the ink ejection order from the recording head 612, that is, the superposition order of respective colors on the recording medium, is determined in advance, and the printer driver 602 holds information of that superposition order.

Note that the dot layout patterning unit 609 and mask data transforming unit 610 in the printer 401 are configured by dedicated hardware circuits, and operate under the control of a CPU (not shown) which configures a control unit of the printer 401. Note that these processes may be executed by the CPU according to corresponding programs, or may be executed by, for example, the printer driver 602 in the PC 402. As can be seen from the following description, these processing modes are not particularly limited in the present invention.

Print Data Creation Processing

Figure 7:
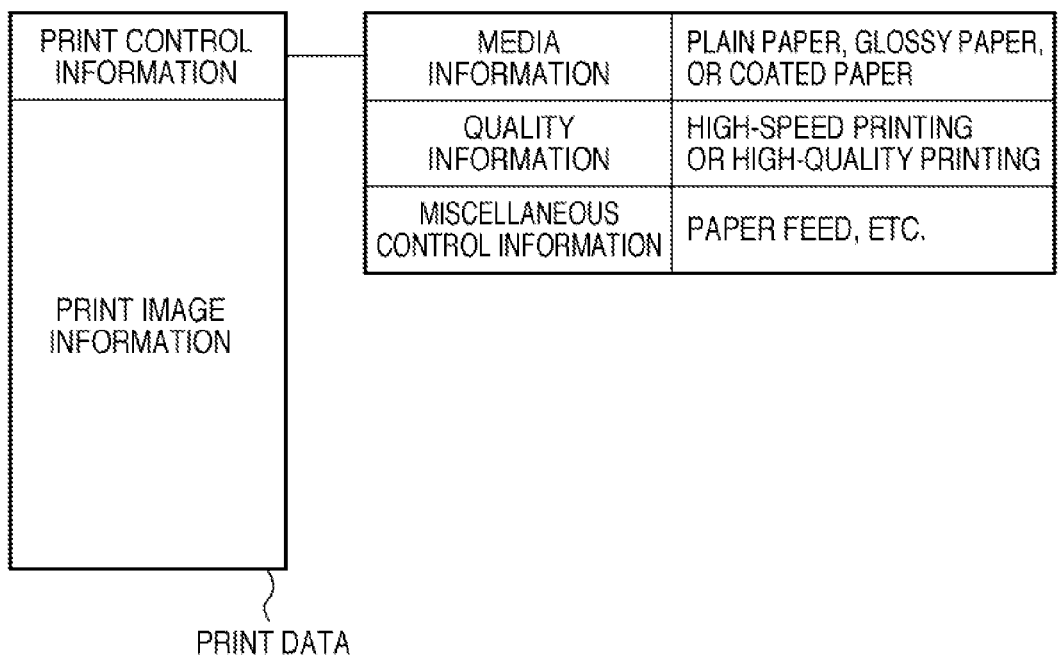
FIG. 7 is a view showing a configuration example of print data according to the first embodiment.

Details of the processing in the print data creation unit 607 will be described below. The print data creation unit 607 receives data after the halftoning processing. Assume that according to the halftoning processing of this embodiment, multi-valued (256-valued) density information (8-bit data) is distributed to 9 levels, that is, 9-valued tone level information (4-bit data) by the error diffusion processing. The print data creation unit 607 generates print data to be output to the printer 401 in practice by formatting the data after the halftoning processing to a predetermined format. FIG. 7 shows a configuration example of the generated print data. As shown in FIG. 7, the print data is configured by print control information required to control a print operation, and print image information (also called print image data). The print control information is configured by "media information" which records that image, "quality information" of printing, and "miscellaneous control information" such as a paper feed method. The "media information" describes a type of a paper sheet used in recording, and specifies one type of a paper sheet of plain paper, glossy paper, and coated paper. The "quality information" describes a print quality, and specifies one of qualities of high-speed printing and high-quality printing. Note that these pieces of print control information are formed based on the contents designated by the user at the PC 402. The print image information describes 4-bit data C, M, Y, K, Lc, and Lm generated by the halftoning processing in the previous stage. The print data of the colored inks generated in this way is supplied to the dot layout patterning unit 609 in the printer 401.

Dot Layout Patterning Processing

The processing in the dot layout patterning unit 609 in the printer 401 will be described in detail below. As described above, the dot layout patterning unit 609 lays out dots of respective inks based on the print data associated with the colored inks input from the print data creation unit 607, and those associated with the colorless inks input from the colorless dot layout unit 608.

Colored dot layout processing associated with the colored inks will be described first. In this embodiment, the halftoning processing lowers the number of levels from the multi-valued (256-valued) density information (8-bit data) to 9-valued tone level information (4-bit data). However, information that the printer 401 can record in practice is binary information indicating whether or not to record an ink. Therefore, in the printer 401, the dot layout patterning unit 609 reduces a multi-valued level ranging from 0 to 8 (4 bits) to a binary level required to decide ON/OFF of a dot. More specifically, for each pixel expressed by 4-bit data of one of levels 0 to 8 after the halftoning processing, a colored dot layout pattern corresponding to a tone level (levels 0 to 8) of that pixel is assigned. With this pattern, ON/OFF of a dot is defined in each of a plurality of areas in one pixel, and 1-bit ejection data "1" or "0" is laid out in each area in one pixel.

Figure 8:
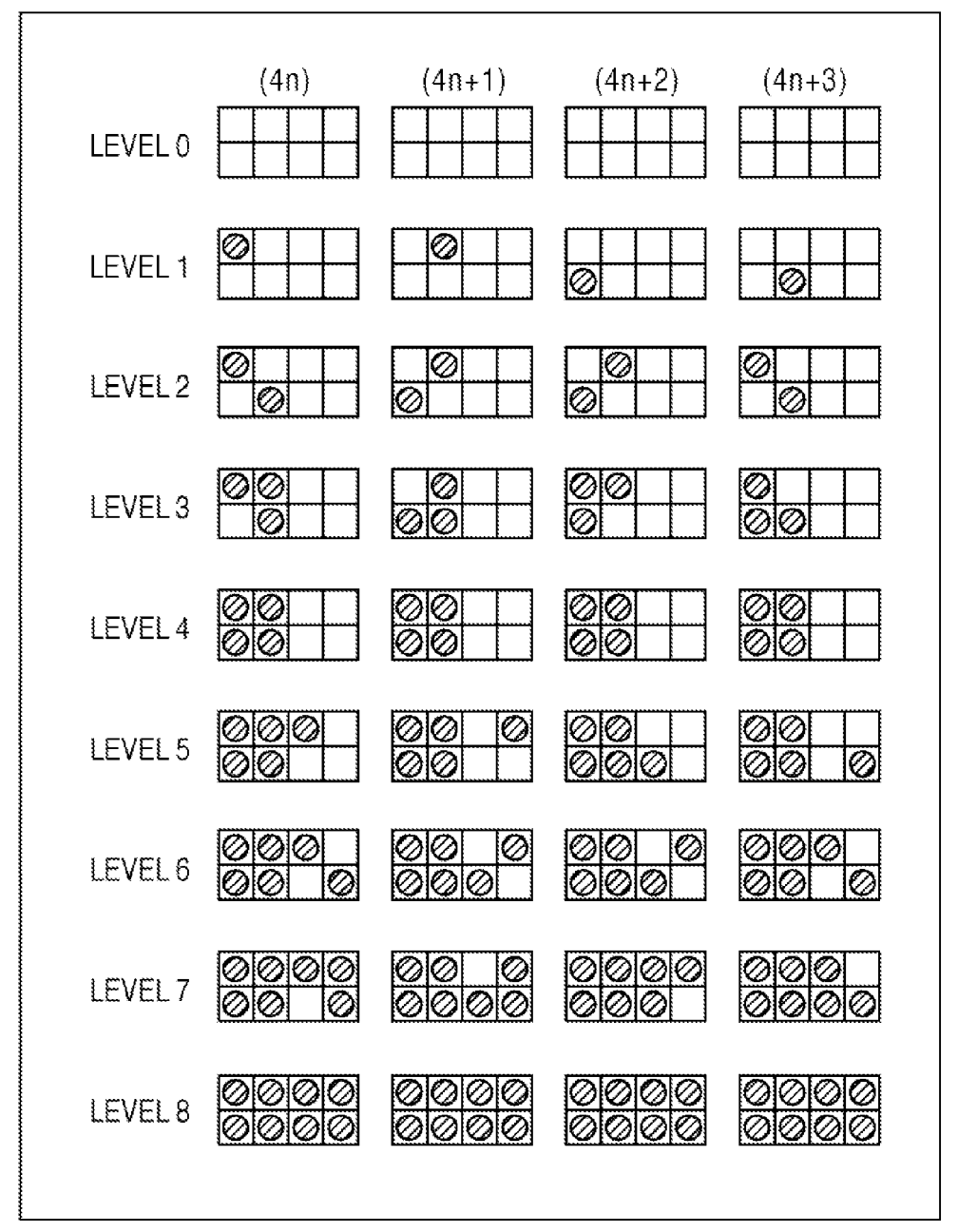

FIG. 8 shows output pattern examples respectively corresponding to input levels 0 to 8 assigned to the colored inks by the dot layout patterning unit 609. That is, the dot layout patterning unit 609 internally holds these output pattern data. Respective level values described at the left end of FIG. 8 correspond to levels 0 to 8 as output values after the halftoning processing, and matrix regions each configured by two vertical areas×four horizontal areas located at the right side correspond to regions of one pixel after the halftoning processing. Note that each area in one pixel corresponds to a minimum unit for which ON/OFF of a dot is defined, and an area in which a circle mark is described indicates that which records a dot (dot ON area). As can be seen from FIG. 8, as the number of levels becomes larger, the number of dots to be recorded is increased one by one. In this embodiment, by controlling the dot layout patterns of the colored inks in this way, density information of an original image is reflected to an image after printing. (4n) to (4n+3) shown at the upper end in FIG. 8 indicate pixel positions in the horizontal direction from the left end of an input image by substituting an integer equal to or larger than 1 in a variable n, and a plurality of different patterns are prepared for each input level according to pixel positions. More specifically, even when an identical level is input, four different dot layout patterns indicated by (4n) to (4n+3) are cyclically assigned on a recording medium.

In FIG. 8, the vertical direction agrees with a nozzle arrangement direction of the recording head, and the horizontal direction agrees with the scanning direction of the recording head. Therefore, by adopting the aforementioned configuration that allows recording using various dot layouts for an identical level, the following effects can be obtained. That is, the numbers of ejection times can be dispersed to nozzles located in an upper stage of each dot layout pattern and to those located in a lower stage, or various kinds of noise components unique to a recording apparatus can be dispersed.

Colorless dot layout processing associated with the colorless inks will be described below. As described above, the colorless dot layout unit 608 sets 9-bit data indicating a type of a colorless ink and a dot layout pattern ID for each pixel. Note that this setting is made with reference to the LUT 6081 as a colorless dot layout table, which is created, as will be described later, using, as indices, the 4-bit data of the colored inks output from the halftoning unit 606. The dot layout patterning unit 609 lays out dots for each colorless ink according to the dot layout pattern ID of each colorless ink. That is, the dot layout patterning unit 609 internally holds the relationship between the dot layout pattern IDs associated with the colorless inks and actual dot layout patterns. In this manner, by assigning a dot layout pattern corresponding to the pattern ID of each pixel expressed by the 9-bit data to that pixel, ON/OFF of each colorless ink dot can be defined for each of a plurality of areas in one pixel. In this manner, ejection data "1" or "0" is laid out for each area in one pixel in association with each colorless ink.

Upon completion of the aforementioned dot layout patterning processing, all dot layout patterns for respective inks with respect to a recording medium are decided.

As will be described in detail later, by deciding dot layout patterns for all the colored inks by the dot layout patterning unit 609, the colored ink types which exist on the uppermost face of a formed image can be acquired in correspondence with dots. Then, since the superposition order of the colored inks is given, covering factors at which respective colored ink dots, which exist on the uppermost faces, occupy within a unit region of the formed image (to be referred to as colored dot covering factors) can be acquired. Hence, in this embodiment, the LUT 6081 used to decide colorless ink types and their dot layouts to be superposed on colored ink dots according to the colored dot covering factors of the respective colors is prepared, and is held in the colorless dot layout unit 608. By controlling the use method of the colorless inks by the LUT 6081 for colorless dot layouts, the gloss uniformity on the entire image can be enhanced.

Specular Glossiness Control Using Colorless Ink

This embodiment aims at uniforming the specular glossiness of the surface of an image formed on a recording medium using the pigment inks by the printer 401 using the colorless inks. The principle of the specular glossiness control using the colorless inks according to this embodiment will be described below. According to literature 3 (specular glossiness measurement method (JIS Z 8741)), the specular glossiness is expressed by:

$$G_S(\theta) = \frac{\phi_S}{\phi_{OS}} \cdot G_{OS}(\theta) \tag{1}$$

where $\phi_S$: a reflected light beam from a sample plane with respect to a prescribed incident angle $\theta$;

$\phi_{OS}$: a reflected light beam from a standard plane with respect to the prescribed incident angle $\theta$; and $G_{OS}$: a gloss (%) of the used standard plane. The gloss $G_{OS}$ is given by:

$$G_{OS}(\theta) = \frac{\int S_D(\lambda)V(\lambda)\rho(\theta,\lambda)d\lambda}{\int S_D(\lambda)V(\lambda)d\lambda} \cdot \frac{1}{\rho_0(\theta)} \times 100 \tag{2}$$

where $S_D(\lambda)$: a relative spectral distribution of standard light $D_{65}$;
$V(\lambda)$: a reflected light beam from the standard plane with respect to the prescribed incident angle $\theta$;

$\rho_0(\theta, \lambda)$: a specular reflectance at the incident angle $\theta$ prescribed on a glass surface whose refractive index assumes a constant value "1.567" on the overall visual wavelength range; and $\rho(\theta, \lambda)$: a spectral specular reflectance of a primary standard plane at the prescribed incident angle $\theta$. The spectral specular reflectance is calculated using a refractive index $n(\lambda)$ by a Fresnel equation given by:

$$\rho(\theta, \lambda) = \tag{3}$$
$$\frac{1}{2}\left[\left(\frac{\cos\theta - \sqrt{n(\lambda)^2 - \sin^2\theta}}{\cos\theta + \sqrt{n(\lambda)^2 - \sin^2\theta}}\right)^2 + \left(\frac{n(\lambda)^2\cos\theta - \sqrt{n(\lambda)^2 - \sin^2\theta}}{n(\lambda)^2\cos\theta + \sqrt{n(\lambda)^2 - \sin^2\theta}}\right)^2\right]$$

According to the specular glossiness measurement condition described in literature 3, as a light source and light-receiving device, those which are equivalent to a combination of standard light D65 described in literature 4 and spectral luminous efficiency equal to a color matching function $y(\lambda)$ described in non-patent literature 3 are used. That is, if a spectral specular reflectance $\alpha(\theta, \lambda)$ of reflected light with respect to the incident angle $\theta$ of an arbitrary specular glossiness measurement sample is detected, a reflected light beam $\phi_S$ from the sample plane in equation (1) can be simulated by:

$$\phi_s = \int S_D(\lambda)V(\lambda)\alpha(\theta,\lambda)d\lambda \tag{4}$$

Likewise, the reflected light beam $\phi_{OS}$ of the primary standard plane can also be simulated using the spectral specular reflectance $\rho(\theta, \lambda)$ of the standard plane given by equation (2), as given by:

$$\phi_{os} = \int S_D(\lambda)V(\lambda)\rho(\theta,\lambda)d\lambda \tag{5}$$

That is, when equation (1) above is modified using equations (2), (4), and (5), it is possible to simulate, using the spectral specular reflectance $\alpha(\theta, \lambda)$ with respect to an angle $\theta$ of an arbitrary sample, the specular glossiness $G_S(\theta)$ by:

$$G_S(\theta) = \frac{\int S_D(\lambda)V(\lambda)\alpha(\theta,\lambda)d\lambda}{\int S_D(\lambda)V(\lambda)d\lambda} \cdot \frac{1}{\rho_0(\theta)} \times 100 \tag{6}$$

Note that as a method of calculating a spectral specular reflectance of reflected light with respect to the incident angle $\theta$ of the sample plane whose refractive index $n(\lambda)$ is given, the aforementioned Fresnel equation (3) is applicable. That is, by acquiring refractive indices $n(\lambda)$ of all inks used in a pigment ink-jet printer (printer 401), spectral specular reflectances $\rho(\theta, \lambda)$ calculated from the respective refractive indices using equation (3) can be acquired.

Furthermore, if the spectral specular reflectances and colored dot covering factors of the respective colored inks are detected, a spectral specular reflectance per arbitrary unit region corresponding to one pixel in a combination of, for example, cyan and magenta, can be calculated by the principle of additive mixture. This calculation processing follows:

$$\rho_c(\theta, \lambda) = \tag{7}$$
$$\frac{1}{2}\left[\left(\frac{\cos\theta - \sqrt{n_c(\lambda)^2 - \sin^2\theta}}{\cos\theta + \sqrt{n_c(\lambda)^2 - \sin^2\theta}}\right)^2 + \left(\frac{n_c(\lambda)^2\cos\theta - \sqrt{n_c(\lambda)^2 - \sin^2\theta}}{n_c(\lambda)^2\cos\theta + \sqrt{n_c(\lambda)^2 - \sin^2\theta}}\right)^2\right]$$

-continued $$\rho_m(\theta, \lambda) = \frac{1}{2}\left[\left(\frac{\cos\theta - \sqrt{n_m(\lambda)^2 - \sin^2\theta}}{\cos\theta + \sqrt{n_m(\lambda)^2 - \sin^2\theta}}\right)^2 + \left(\frac{n_m(\lambda)^2\cos\theta - \sqrt{n_m(\lambda)^2 - \sin^2\theta}}{n_m(\lambda)^2\cos\theta + \sqrt{n_m(\lambda)^2 - \sin^2\theta}}\right)^2\right] \quad (8)$$

$$\rho_{cm}(\theta, \lambda) = r_c \cdot \rho_c(\theta, \lambda) + r_m \cdot \rho_m(\theta, \lambda) \quad (9)$$

where $\rho_c(\theta, \lambda)$: a spectral specular reflectance of the C ink at the incident angle $\theta$;

$n_c(\lambda)$: a refractive index of the C ink;

$\rho_m(\theta, \lambda)$: a spectral specular reflectance of the M ink at the incident angle $\theta$;

$n_m(\lambda)$: a refractive index of the M ink;

$\rho_{c,m}(\theta, \lambda)$: a spectral specular reflectance at the time of mixture of the C and M inks at the incident angle $\theta$;

$r_c$: a colored dot covering factor of the C ink; and $r_m$: a colored dot covering factor of the M ink.

As can be seen from the above description, upon superposing a colorless ink on each colored dot, the specular glossiness of the formed image surface can be controlled without changing any tints of the image if a refractive index of that colorless ink and a covering factor at which the colorless ink dots occupy the uppermost faces (color dot covering factor) can be controlled.

The refractive indices of colorless inks vary depending on their compositions. The compositions of the colorless inks used in this embodiment will be described in detail below. The printer 401 of this embodiment incorporates the plurality of types of colorless inks, which have different refractive indices. FIG. 10 shows a composition of a solvent which is common to the plurality of types of colorless inks in this embodiment. A resin aqueous solution prepared by neutralizing each of two types of polymers (polymers A and B) having different compositions, as shown in FIG. 11, by alkali (for example, potassium hydroxide aqueous solution) is added to the solvent. With this operation, a colorless ink which has a relatively high refractive index and does not contain any color material is prepared for the polymer A, and a colorless ink which has a relatively low refractive index and does not contain any color material is prepared for the polymer B. Note that the polymer A or B may contain, for example, general carbon black as a color material in a small amount to prepare a light gray ink. The content of the color material in this case is 0.2% or less in case of the light gray ink while the black ink contains carbon black of 3.5%. The light gray ink is used in the same manner as a light ink in a printer which incorporates known dark and light inks of an identical hue. The content of the color material in the light gray ink is not limited to the above specific numerical value, but it may assume a value which does not make a background color cloud when the gray ink is printed to be superposed on the background. Note that an increment/decrement of the color material such as carbon black is adjusted by increasing/decreasing pure water.

In this embodiment, in order to attain high gloss uniformity in the arrangement which can eject the plurality of types of colorless inks having different refractive indices on the image surface, the LUT which controls the colorless ink type to be ejected and its ejection position (colorless dot layout) is created.

Colorless Dot Layout Table Creation Processing

Figure 9:
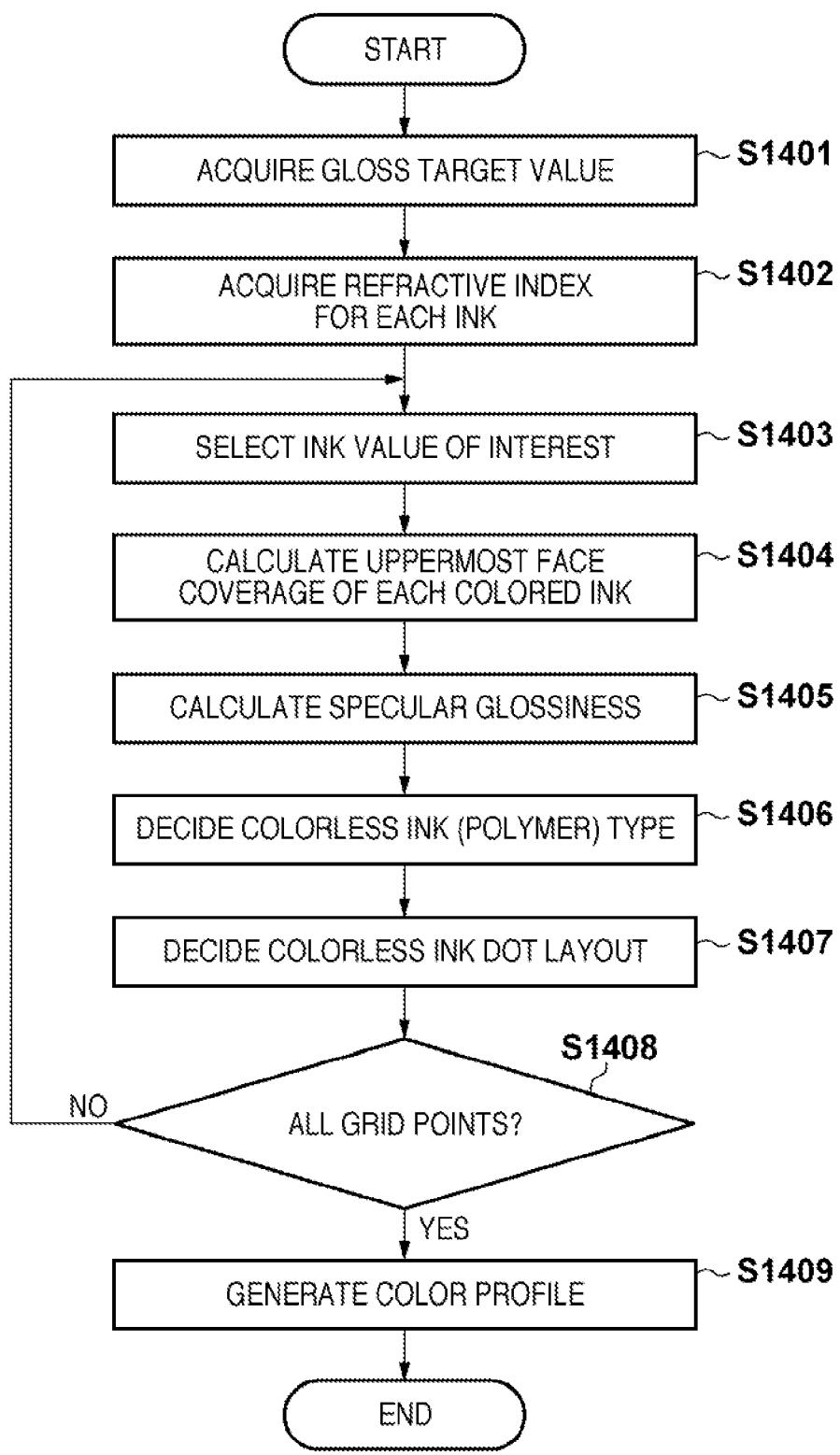
FIG. 9 is a flowchart showing creation processing of a transparent and colorless dot layout table according to the first embodiment.

As described above, in this embodiment, the LUT 6081 which controls the types and dot layouts of the colorless inks to be ejected to be superposed on the colored ink dots is created, and is held in the colorless dot layout unit 608. The creation processing of the colorless dot layout LUT 6081 in this embodiment will be described in detail below with reference to the flowchart of FIG. 9. Note that this LUT creation processing is implemented when the CPU 502 executes a corresponding program. Assume that in this embodiment, the colored inks are configured by six colors C, M, Y, K, Lc, and Lm, and the colorless dot layout LUT 6081 is set with the types and dot layouts of the colorless inks according to the ink values of the six colors.

Figures 12, 13:
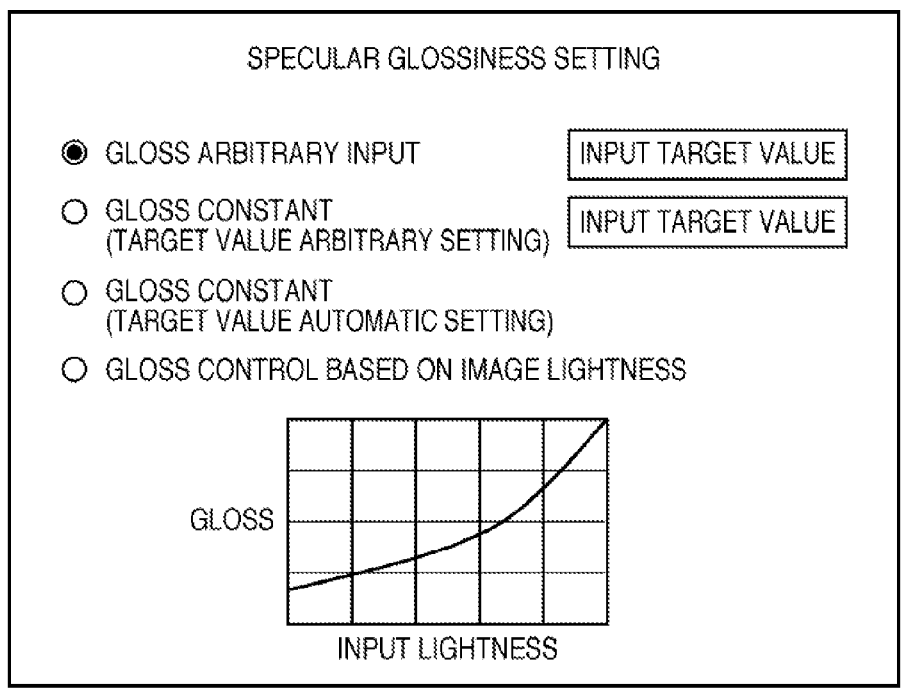
FIG. 12 shows an example of a specular glossiness target value setting UI according to the first embodiment.
FIG. 13 is a table showing examples of colorless ink polymer compositions according to the second embodiment.

In step S1401, a gloss target value is acquired. In this case, the gloss target value is a target value as the specular glossiness described in literature 3 above. For example, a UI shown in FIG. 12 is displayed on the display 512, and the user inputs the gloss target value using the input device such as the keyboard and mouse 511. When the user designates a value while selecting "gloss arbitrary input" on the UI shown in FIG. 12, the input value is designated as the gloss target value for an image signal input after the LUT 6081 is set. When the user arbitrarily sets a gloss target value while selecting "gloss constant", the target value input by the user or a predetermined value in case of an automatic setting is applied to all subsequent input image signals. Likewise, when the user selects "gloss control based on image lightness", he or she sets a lightness-gloss characteristic on a lower graph by dragging, and this characteristic is applied to all subsequent input image signals. Therefore, when the user selects "gloss constant" or "gloss control based on image lightness", the setting value is stored in, for example, the RAM 504, and the UI shown in FIG. 12 is not displayed in the next loop. That is, the process in step S1401 may be skipped. The gloss target value set in this step is stored in the RAM 504 or in the HD 509 if it has a large size.

In step S1402, refractive indices of all the inks incorporated in the printer 401 as well as the plurality of types of colorless inks are acquired. These refractive indices are held in advance in, for example, the HD 509, and the acquired refractive indices for respective inks are stored in the RAM 504.

In steps S1403 to S1407, the colorless ink to be set in the LUT 6081 and its dot layout are decided. These processes are executed for all grid points in the LUT 6081. As the grid points of the LUT 6081, all of 262144 grid points, which are obtained by equally dividing each of the 4-bit signals C, M, Y, K, Lc, and Lm corresponding to output signals from the halftoning unit 606 into seven to set eight grid points, can be used. However, the number of grid points is not limited to such specific example, and it may be arbitrarily set.

In step S1403, one grid point in the LUT 6081 is set as an ink value of interest, and is stored in the RAM 504. In step S1404, the ink value of interest (C, M, Y, K, Lc, Lm) selected in step S1403 is output to the printer 401 via the print data creation unit 607, and the dot layout patterning unit 609 assigns a dot layout when that value is actually output. The result is output to the PC 402 side, and since the superposition order of the respective ink colors upon printing the ink value of interest (C, M, Y, K, Lc, Lm) is given, the colored ink types (uppermost face colors) which exist on the uppermost faces of respective dots can be calculated. Therefore, the colored dot covering factors of the respective dots of the uppermost face colors in a unit region of a print image can be calculated. Note that as this unit region, for example, 2×4 dots corresponding to one pixel shown in FIG. 8 can be used. The values of the colored dot covering factors of the respective uppermost face colors obtained by analyzing the colored dot layout pattern are stored in the RAM 504 or HD 509.

In step S1405, a specular glossiness is calculated based on the colored dot covering factors for respective uppermost face colors for the ink color of interest, which are calculated in step S1404, and the refractive indices of the respective inks acquired in step S1402. More specifically, the specular glossiness can be simulated by calculating the spectral specular reflectance for each pixel according to combinations of colored inks as in the combination example of cyan and magenta shown in equations (7) and (8) above. For example, when inks C, Lc, Y, and M are used for one pixel indicated by the ink color of interest, a spectral specular reflectance of the inks C, Lc, Y, and M at the incident angle θ is calculated using their refractive indices as in equations (7) to (9) above. Then, a spectral specular reflectance $\rho_{c,Lc,y,m}(\theta, \lambda)$ at the time of mixture of the C, Lc, Y, and M inks at the incident angle θ is calculated using the colored dot covering factors of the respective inks in a unit region, which corresponds to 2×8 dots corresponding to one pixel, using:

$$\rho_{c,Lc,y,m}(\theta,\lambda) = r_c \cdot \rho_c(\theta,\lambda) + r_{Lc} \cdot \rho_{Lc}(\theta,\lambda) + r_y \cdot \rho_y(\theta,\lambda) + r_m \cdot \rho_m(\theta,\lambda) \quad (10)$$

where $\rho_c(\theta, \lambda)$: a spectral specular reflectance of the C ink at the incident angle θ;

$n_c(\lambda)$: a refractive index of the C ink;

$\rho_{Lc}(\theta, \lambda)$: a spectral specular reflectance of the Lc ink at the incident angle θ;

$n_{Lc}(\lambda)$: a refractive index of the Lc ink;

$\rho_y(\theta, \lambda)$: a spectral specular reflectance of the Y ink at the incident angle θ;

$n_y(\lambda)$: a refractive index of the Y ink;

$\rho_m(\theta, \lambda)$: a spectral specular reflectance of the M ink at the incident angle θ;

$n_m(\lambda)$: a refractive index of the M ink;

$\rho_{c,Lc,y,m}(\theta, \lambda)$: a spectral specular reflectance at the time of mixture of the C, Lc, Y, and M inks at the incident angle θ;

$r_c$: a colored dot covering factor of the C ink;

$r_{Lc}$: a colored dot covering factor of the Lc ink;

$r_y$: a colored dot covering factor of the Y ink; and $r_m$: a colored dot covering factor of the M ink.

Then, from equation (6), a specular glossiness $G_{c,Lc,y,m}(\theta)$ of the unit region at the time of mixture of the C, Lc, Y, and M inks at the incident angle θ is calculated, as given by:

$$G_{c,Lc,y,m}(\theta) = \frac{\int S_D(\lambda) V(\lambda) \rho_{c,Lc,y,m,pb}(\theta, \lambda) d\lambda}{\int S_D(\lambda) V(\lambda) d\lambda} \cdot \frac{1}{\rho_0(\theta)} \times 100 \quad (11)$$

As given by equations (10) and (11) above, the specular glossiness of the image surface can be calculated from the colored dot covering factors for respective ink types which exist on the uppermost faces, and the refractive indices of the respective colored inks acquired in step S1402. The calculated specular glossiness is stored in, for example, the RAM 504.

In step S1406, of the colorless inks incorporated in the printer 401 such as those which are prepared using the polymers A and B having the different refractive indices, as described above, a colorless ink type for the ink value of interest is decided. More specifically, the specular glossiness for the ink value of interest, which is calculated in step S1405, is compared with the gloss target value set in step S1401. Then, when the specular glossiness of the ink value of interest is higher than the gloss target value, the colorless ink prepared using the polymer B having a relatively low refractive index is selected to make the calculated specular glossiness be closer to the target gloss value. This is because a higher specular glossiness is generally obtained for an ink having a higher refractive index. Therefore, when the specular glossiness for the ink value of interest is equal to or lower than the gloss target value, the colorless ink prepared using the polymer A having a relatively high refractive index is selected. Note that when the specular glossiness for the ink value of interest is nearly equal to the gloss target value, for example, formation of a dot of the colorless ink may be set to be skipped. The colorless ink type decided in this step is stored in, for example, the RAM 504.

In step S1407, a dot layout (colorless dot layout) of the colorless ink selected in step S1406 is decided. That is, when the colorless ink having the low refractive index is selected to suppress the specular glossiness, it is controlled to cover a colored ink having the highest refractive index. On the other hand, when the colorless ink having the high refractive index is selected to increase the specular glossiness, it is controlled to cover a colored ink having the lowest refractive index, or to cover the surface if the recording medium surface which generally has a lower refractive index than the colored ink is exposed.

The colorless dot layout decision method will be described below while taking as an example a case in which the colorless ink having the low refractive index is selected to decrease the specular glossiness. Assume that the colored ink having the highest refractive index is the C ink. Letting $n_{pb}(\lambda)$ be a refractive index of the colorless ink using the polymer B, a spectral specular reflectance $\rho_{pb}(\theta, \lambda)$ of this colorless ink is calculated by:

$$\rho_{pb}(\theta, \lambda) = \frac{1}{2}\left[\left(\frac{\cos\theta - \sqrt{n_{pb}(\lambda)^2 - \sin^2\theta}}{\cos\theta + \sqrt{n_{pb}(\lambda)^2 - \sin^2\theta}}\right)^2 + \left(\frac{n_{pb}(\lambda)^2\cos\theta - \sqrt{n_{pb}(\lambda)^2 - \sin^2\theta}}{n_{pb}(\lambda)^2\cos\theta + \sqrt{n_{pb}(\lambda)^2 - \sin^2\theta}}\right)^2\right] \quad (12)$$

In this case, letting $r_{pb}$ be a colorless dot covering factor, and assuming that the colorless ink covers all the C ink dots, the specular glossiness $G_{c,Lc,y,m}(\theta)$ at the mixture of the C, Lc, Y, and M inks is calculated by:

$$\rho_{c,Lc,y,m,pb}(\theta,\lambda) = (r_c - r_{pb}) \cdot \rho_c(\theta,\lambda) + r_{Lc} \cdot \rho_{Lc}(\theta,\lambda) + r_y \cdot \rho_y(\theta, \lambda) + r_m \cdot \rho_m(\theta,\lambda) + r_{pb} \cdot \rho_{pb}(\theta,\lambda) \quad (13)$$

$$G_{c,Lc,y,m}(\theta) = \frac{\int S_D(\lambda) V(\lambda) \rho_{c,Lc,y,m}(\theta, \lambda) d\lambda}{\int S_D(\lambda) V(\lambda) d\lambda} \cdot \frac{1}{\rho_0(\theta)} \times 100 \quad (14)$$

As can be seen from equation (13), a value obtained by subtracting the colorless dot covering factor $r_{pb}$ from the colored dot covering factor $r_c$ of the C ink contributes as a practical colored dot covering factor of the C ink.

The gloss control of this embodiment is implemented by calculating the colorless dot covering factor $r_{pb}$ of the colorless ink (corresponding to the polymer B), so that the specular glossiness calculated using equation (14) satisfies the gloss target value acquired in step S1401.

Note that when the colorless ink is set to cover all the C ink dots, that is, the colorless dot covering factor is set to be equal to the colored dot covering factor of the C ink, and the specular glossiness is higher than the target value, the colorless ink can be controlled to further cover dots of a colored ink having the second highest refractive index. For example, assuming that the ink having the second highest refractive index is the M ink, equation (13) above is modified to:

$$\rho_{c,Lc,y,m,pb}(\theta,\lambda)=r_{Lc}\cdot\rho_{Lc}(\theta,\lambda)+r_y\cdot\rho_y(\theta,\lambda)+(r_m-(r_{pb}-r_c))\cdot\rho_m(\theta,\lambda)+r_{pb}\cdot\rho_{pb}(\theta,\lambda) \quad (15)$$

As can be seen from equation (15), a contribution of the C ink to the spectral reflectance is removed, and a difference $(r_{pb}-r_c)$ when the colorless dot covering factor exceeds the colored dot covering factor of the C ink further covers the M ink dots.

In this manner, according to this embodiment, the specular glossiness is calculated while controlling the colorless ink using the polymer B to cover the colored inks in descending order of refractive index, and the colorless dot covering factor is decided so that the specular glossiness is closer to the gloss target value. The colorless dot covering factor is repetitively calculated until a difference between the specular glossiness and gloss target value becomes equal to or smaller than a threshold indicating that they are sufficiently closer to each other. Then, by adjusting the ejection amounts and ejection positions of the colorless ink, that is, the colorless dot layout according to the colorless dot covering factor, the dot layout of the colorless ink is decided. As the dot layout of the colorless ink decided in this case, that within 2×4 areas shown in FIG. 8 is assumed, as in the case of the colored inks. That is, pattern IDs are assigned to a total of 256 dot layouts which can be assumed in the 2×4 areas, and a corresponding pattern ID is acquired as a dot layout of the colorless ink decided for the ink value of interest and is stored in, for example, the RAM 504 or HD 509.

The case has been explained wherein the colorless ink (corresponding to the polymer B) having the low refractive index is selected to decrease the specular glossiness. Also, when the colorless ink (corresponding to the polymer A) having the high refractive index is selected to increase the specular glossiness, the same control can be executed. That is, a colorless dot covering factor $r_{pa}$ of the colorless ink having the high refractive index can be controlled so that the colorless ink covers the colored inks and recording medium exposed portions, where none of colored ink dots are laid out, in ascending order of refractive index. As described above, since the refractive index of the recording medium surface is generally lower than that of each colored ink, the colorless dot layout is set, so that a recording medium exposed portion is covered by the colorless ink first if it exists, and an colored ink having a lowest refractive index is covered if no exposed portion exists.

It is checked in step S1408 if the processes in steps S1403 to S1407 are complete for all grid points of the LUT 6081. If the processes are complete for all the grid points, the process advances to step S1409; if grid points to be processed still remain, the process returns to step S1403 to repeat the processes for the next grid point.

Finally, in step S1409, input values (C, M, Y, K, Lc, Lm), identifiers indicating the colorless ink types to be used, and pattern IDs indicating the dot layouts of the colorless inks are associated with each other for all the grid points of the LUT 6081, thus ending the processing.

In this embodiment, when the colorless dot layout unit 608 looks up the LUT 6081 which is created, as described above, the type of the colorless ink and its dot layout are decided according to a quantized ink value output from the halftoning unit 606. That is, the colorless inks to be used are switched according to the dot layouts of the colored inks, so that the colorless ink having the low refractive index is ejected onto the colored ink having the high refractive index, and the colorless ink having the high refractive index is ejected onto the colored ink having the low refractive index. Since information indicating the colorless ink type and its dot layout, which are decided in this way, is sent to the printer 401 as print data of the colorless ink, the designated colorless ink is ejected at a designated position after the colored inks are ejected. By repeating this processing for respective pixels of image data, a gloss closer to the target gloss value can be obtained on the entire region of a printed matter, thus enhancing the gloss uniformity.

As described above, according to this embodiment, since the LUT for colorless dot layouts is created so that the plurality of types of colorless inks having different refractive indices are selectively used according to the dot layouts of the colored inks used to form an image, the gloss uniformity on the formed image surface can be enhanced.

Note that this embodiment has exemplified the case in which the two types of colorless inks having different refractive indices are used. However, the number of types of colorless inks to be used in the present invention is not limited to two, but three or more types of colorless inks may be used. In this case, when the specular glossiness calculated according to the colored dot layout is higher than the gloss target value, a colorless dot layout can be set to superpose a colorless ink having a lowest refractive index on a colored ink having a highest refractive index. Likewise, when the calculated specular glossiness is equal to or lower than the gloss target value, a colorless dot layout can be set to superpose a colorless ink having a highest refractive index on a colored ink having a lowest refractive index or a recording medium exposed portion.

In the description of this embodiment, the output from the LUT 6081 for colorless dot layouts assumes a value of a total of 9 bits indicating an identifier (1 bit) of a colorless ink type and a pattern ID (8 bits) of its dot layout. However, the LUT format is not limited to such specific example. For example, a dot layout pattern may be set for each colorless ink. In this case, a pattern of all OFF dots is set for a colorless ink, which is not used, and an 8-bit output indicating a dot layout pattern ID for each colorless ink is used.

Second Embodiment

The second embodiment of the present invention will be described below. Note that since the arrangement of an image forming system according to the second embodiment is the same as that of the first embodiment described above, a description thereof will not be repeated. The aforementioned first embodiment has exemplified the case in which the gloss uniformity of an image is attained, so that polymer compositions used for a plurality of types of colorless inks are prepared to have different refractive indices. However, the gloss control of the present invention is not limited to the example using the different refractive indices. The second embodiment will exemplify a case in which polymer compositions having different permeabilities are applied as a plurality of types of colorless inks.

Specular Glossiness Control Using Colorless Ink

By preparing polymer compositions having different permeabilities as a plurality of types of colorless inks, the unevenness of an image surface which influences the specular glossiness of an image can be controlled. FIG. 13 shows examples of polymer compositions according to the second embodiment. For example, a resin aqueous solution obtained by neutralizing each of two types of polymers (polymers C and D) having different compositions, as shown in FIG. 13, by alkali (for example, potassium hydroxide aqueous solution) is added to a solvent shown in FIG. 10. With this operation, a colorless ink which has a relatively high permeability and does not contain any color material is prepared for the polymer C, and a colorless ink which has a relatively low permeability and does not contain any color material is prepared for the polymer D. Note that the polymer C or D may contain, for example, general carbon black as a color material in a small amount to prepare a light gray ink. The content of the color material in this case is 0.2% or less in case of the light gray ink while the black ink contains carbon black of 3.5%. The light gray ink is used in the same manner as a light ink in a printer which incorporates known dark and light inks of an identical hue. The content of the color material in the light gray ink is not limited to the above specific numerical value, but it may assume a value which does not make a background color cloud when the gray ink is printed to be superposed on the background. Note that an increment/decrement of the color material such as carbon black is adjusted by increasing/decreasing pure water.

Landing state differences due to different permeabilities of the colorless inks of the second embodiment will be described below with reference to FIGS. 14A to 14C. Note that the permeability of the colorless ink in the second embodiment indicates a degree of permeation to a colored ink, and the colorless ink does not permeate a recording medium. FIG. 14A represents a state in which a colorless ink is to further land on a colored ink which has already landed on a recording medium. FIG. 14B shows a surface state of the recording medium when the colorless ink shown in FIG. 14A has a highly permeable property, and permeates the colored ink after landing. FIG. 14C shows a surface state of the recording medium when the colorless ink shown in FIG. 14A has a poorly permeable property, and remains on the colored ink after landing. As can be seen from FIGS. 14A to 14C, the surface state of the recording medium can be controlled by controlling the permeability of the colorless ink to be landed on the colored ink.

Hence, as in the first embodiment, the second embodiment is characterized in that in order to attain the gloss uniformity of a formed image, an LUT 6081 for colorless dot layouts, which LUT is to be looked up by a colorless dot layout unit 608, is created in consideration of use of a plurality of colorless inks having different permeabilities.

Creation Processing of Colorless Ink Setting LUT

Processing for creating the LUT 6081 for colorless dot layouts according to the second embodiment will be described in detail below with reference to the flowchart of FIG. 15. Note that in the second embodiment as well, colored inks are configured by six colors C, M, Y, K, Lc, and Lm.

In step S2001, as in step S1403 of the first embodiment, one grid point serving as an ink value of interest is selected from all grid points which configure the LUT 6081, and is stored in a RAM 504. Note that the number of grid points of the LUT 6081 is not limited to 4096, as described above.

In step S2002, a surface unevenness at the time of image formation is calculated based on the ink value of interest selected in step S2001. That is, the ink value of interest (C, M, Y, K, Lc, Lm) is output to a printer 401 via a print data creation unit 607, and a dot layout patterning unit 609 assigns a dot layout when that value is actually output. This result is output to a PC 402 side, and since ejection amounts and ejection positions of all the colored inks are settled, the number of dots in an arbitrary region of a recording medium upon printing the ink value of interest (C, M, Y, K, Lc, Lm) can be counted. For example, the unevenness state of the image surface can be predicted by calculating how many dots are ejected for each of positions A, B, and C as a minimum unit according to the resolutions in the main scan direction and sub-scan direction, as shown in, for example, FIG. 16. The predicted surface unevenness state is stored in the RAM 504 or an HD 509.

In step S2003, a colorless ink type for each dot of the colored dot layout assigned to the ink value of interest is decided according to the surface unevenness state calculated in step S2002. As this colorless ink type, one of colorless inks incorporated in the printer 401 such as those using the polymers C and D having different permeabilities is selected. That is, 2×4 areas shown in FIG. 8 are assigned to the ink value of interest, and a colorless ink type is set for each area, thereby setting a dot layout for each colorless ink. More specifically, when a deposition amount of the colored inks is large like the position B shown in FIG. 16, the colorless ink using the polymer C having the high permeability is laid out. On the other hand, when a deposition amount of the colored ink is small like the position C, the colorless ink using the polymer D having the low permeability is laid out. Then, the colorless inks can be controlled to permeate a portion where the deposition amount of the colored inks is large, and to be deposited on a portion where the deposition amount of the colored ink is small. Note that as a magnitude determination method of the colored ink deposition amount, for example, the colored ink deposition amount for each dot is compared with a predetermined threshold. Then, a large deposition amount can be determined for a portion where the amount is larger than the threshold, and a small deposition amount can be determined for a portion where the amount is equal to or smaller than the threshold.

As the colorless ink types to be set for respective dots, that is, the dot layout for each colorless ink, a dot layout within 2×4 areas shown in FIG. 8 is assumed as in the case of the colored inks. That is, pattern IDs are assigned to a total of 256 colorless dot layouts which can be assumed in the 2×4 areas, and a corresponding pattern ID is acquired as a colorless dot layout decided for the ink value of interest and is stored in, for example, the RAM 504 or HD 509. In this way, by selectively using the colorless inks having different permeabilities according to the degrees of deposition of the colored inks, the degree of unevenness of the image surface can be relaxed, thus consequently enhancing the uniformity of the specular glossinesses.

It is checked in step S2004 whether or not the processes in steps S2001 to S2003 are complete for all grid points of the LUT 6081. If the processes are complete for all the grid points, the process advances to step S2005; if grid points to be processed still remain, the process returns to step S2001 to repeat the processes for the next grid point.

Finally, in step S2005, input values (C, M, Y, K, Lc, Lm) are associated with pattern IDs indicating the dot layouts for respective colorless inks for all the grid points of the LUT 6081, thus ending the processing.

According to the second embodiment, when the colorless dot layout unit 608 looks up the LUT 6081 which is created, as described above, a dot layout for each colorless ink is decided according to a quantized ink value output from a halftoning unit 606. Since information indicating the dot layout for each colorless ink, which is decided in this way, is sent to the printer 401 as print data of the colorless ink, the designated colorless ink is ejected at a designated position after the colored inks are ejected. By repeating this processing for respective pixels of image data, the gloss uniformity on the entire region of a printed matter can be enhanced.

As described above, according to the second embodiment, the LUT for colorless dot layouts is created to selectively use the plurality of types of colorless inks having different permeabilities according to the dot layouts of the colored inks used to form an image. In this way, the gloss uniformity on a formed image surface can be enhanced.

Note that each of the polymers A to D exemplified in the aforementioned first and second embodiments may contain, for example, general carbon black as a color material in a small amount to prepare a light gray ink. The content of the color material in this case is 0.2% or less in case of the light gray ink while the black ink contains carbon black of 3.5%. The content of the color material in the light gray ink is not limited to the above specific numerical value, but it may assume a value which does not make a background color cloud when the gray ink is printed to be superposed on the background. Note that an increment/decrement of the color material such as carbon black is adjusted by increasing/decreasing pure water.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188754, filed Aug. 25, 2010, which is hereby incorporated by reference herein in its entirety.

The invention claimed is:

1. An image forming apparatus, which forms an image using a plurality of colors of colored inks which contain pigment color materials and have different refractive indices, and a plurality of types of colorless inks which contain colorless materials and have different refractive indices, comprising:
a color separating means for acquiring colored ink data for respective colors of the colored inks by color separation processing for each pixel of input color image data;
a colored dot layout means for setting, for each pixel, colored dot layouts of the respective colors of the colored inks according to tone levels of the respective colors indicated by the colored ink data;
a colorless dot layout means for setting, for each pixel, a colorless dot layout for one of the plurality of types of colorless inks with reference to a colorless dot layout table using the colored ink data as indices; and
an image forming means for forming a color image on a recording medium by recording, for each pixel, the respective colored inks in the colored dot layouts, and the colorless ink set by said colorless dot layout means of the plurality of types of colorless inks in the colorless dot layout,
wherein in the colorless dot layout table,
when a specular glossiness calculated according to the colored dot layouts for the colored ink data is higher than a predetermined target value, the colorless dot layout is set to superpose a colorless ink having a lowest refractive index on a colored ink having a highest refractive index, and
when the specular glossiness is not more than the target value, the colorless dot layout is set to superpose a colorless ink having a highest refractive index on a colored ink having a lowest refractive index or on a recording medium exposed portion where none of colored ink dots are laid out.

2. The apparatus according to claim 1, wherein in the colorless dot layout table,
when the specular glossiness calculated according to the colored dot layouts for the colored ink data is higher than the target value, the colorless dot layout is set to superpose the colorless ink having the lowest refractive index on the colored inks in descending order of refractive index in turn until a difference between the specular glossiness and the target value becomes not more than a predetermined threshold, and
when the specular glossiness calculated according to the colored dot layouts for the colored ink data is not more than the target value, the colorless dot layout is set to superpose the colorless ink having the highest refractive index on the colored inks and the recording medium exposed portion in ascending order of refractive index in turn until the difference between the specular glossiness and the target value becomes not more than the predetermined threshold.

3. The apparatus according to claim 1, wherein the colorless dot layout table is created, for each grid point, by
calculating colored dot covering factors at which dots of respective colored inks occupy uppermost faces within a unit region corresponding to the colored dot layouts according to the colored dot layouts for the colored ink data of a grid point of interest,
calculating a specular glossiness in the unit region using refractive indices of the colored inks formed on the uppermost faces and the colored dot covering factors,
calculating, when the specular glossiness is higher than the target value, a colorless dot covering factor at which dots of the colorless ink having the lowest refractive index occupy uppermost faces in the unit region, so that a specular glossiness calculated using the colorless dot covering factor is closer to the target value, and deciding a dot layout in the unit region according to the colorless dot covering factor, and
calculating, when the specular glossiness is lower than the target value, a colorless dot covering factor at which dots of the colorless ink having the highest refractive index occupy uppermost faces in the unit region, so that a specular glossiness calculated using the colorless dot covering factor is closer to the target value, and deciding a colorless dot layout in the unit region according to the colorless dot covering factor.

4. A non-transitory computer-readable storage medium storing a program for controlling a computer apparatus to function as an image forming apparatus of claim 1 when the program is executed by the computer apparatus.

5. An image forming apparatus, which forms an image using a plurality of colors of colored inks which contain pigment color materials, and a plurality of types of colorless inks having different permeabilities, comprising:
a color separating means for acquiring colored ink data for respective colors of the colored inks by color separation processing for each pixel of input color image data;
a colored dot layout means for setting, for each pixel, colored dot layouts of the respective colors of the colored inks according to tone levels of the respective colors indicated by the colored ink data;

a colorless dot layout means for setting, for each pixel, a colorless dot layout for each of the plurality of types of colorless inks with reference to a colorless dot layout table using the colored ink data as indices; and an image forming means for forming a color image on a recording medium by recording, for each pixel, the respective colored inks in the colored dot layouts, and the colorless ink set by said colorless dot layout means of the plurality of types of colorless inks in the colorless dot layout, wherein in the colorless dot layout table, a colored ink dot deposition amount on a recording medium surface is calculated according to the colored dot layouts for the colored ink data, and the colorless dot layout is set to superpose a colorless ink having a highest permeability on a portion where the deposition amount is larger than a predetermined threshold, and to superpose a colorless ink having a lowest permeability on a portion where the deposition amount is not more than the threshold.

6. An image forming method in an image forming apparatus, which forms an image using a plurality of colors of colored inks which contain pigment color materials and have different refractive indices, and a plurality of types of colorless inks which contain colorless materials and have different refractive indices, comprising:

a color separating step of acquiring colored ink data for respective colors of the colored inks by color separation processing for each pixel of input color image data;

a colored dot layout step of setting, for each pixel, colored dot layouts of the respective colors of the colored inks according to tone levels of the respective colors indicated by the colored ink data;

a colorless dot layout step of setting, for each pixel, a colorless dot layout for one of the plurality of types of colorless inks with reference to a colorless dot layout table using the colored ink data as indices; and an image forming step of forming a color image on a recording medium by recording, for each pixel, the respective colored inks in the colored dot layouts, and the colorless ink set in the colorless dot layout step of the plurality of types of colorless inks in the colorless dot layout, wherein in the colorless dot layout table, when a specular glossiness calculated according to the colored dot layouts for the colored ink data is higher than a predetermined target value, the colorless dot layout is set to superpose a colorless ink having a lowest refractive index on a colored ink having a highest refractive index, and when the specular glossiness is not more than the target value, the colorless dot layout is set to superpose a colorless ink having a highest refractive index on a colored ink having a lowest refractive index or on a recording medium exposed portion where none of colored ink dots are laid out.

7. An image forming method in an image forming apparatus, which forms an image using a plurality of colors of colored inks which contain pigment color materials, and a plurality of types of colorless inks having different permeabilities, comprising:

a color separating step of acquiring colored ink data for respective colors of the colored inks by color separation processing for each pixel of input color image data;

a colored dot layout step of setting, for each pixel, colored dot layouts of the respective colors of the colored inks according to tone levels of the respective colors indicated by the colored ink data;

a colorless dot layout step of setting, for each pixel, a colorless dot layout for each of the plurality of types of colorless inks with reference to a colorless dot layout table using the colored ink data as indices; and an image forming step of forming a color image on a recording medium by recording, for each pixel, the respective colored inks in the colored dot layouts, and the colorless ink set in the colorless dot layout step of the plurality of types of colorless inks in the colorless dot layout, wherein in the colorless dot layout table, a colored ink dot deposition amount on a recording medium surface is calculated according to the colored dot layouts for the colored ink data, and the colorless dot layout is set to superpose a colorless ink having a highest permeability on a portion where the deposition amount is larger than a predetermined threshold, and to superpose a colorless ink having a lowest permeability on a portion where the deposition amount is not more than the threshold.

8. An image forming apparatus wherein a gloss corresponding to colored ink data is acquired for each pixel, when the acquired gloss is higher than a predetermined target value, a colorless ink having a lower refractive index of a plurality of types of colorless inks is used in the pixel, and when the gloss is not more than the target value, a colorless ink having a higher refractive index is used in the pixel.

9. A non-transitory computer-readable storage medium storing a program for controlling a computer apparatus to function as an image forming apparatus of claim 8 when the program is executed by the computer apparatus.

10. A control method of an image forming apparatus, comprising the steps of:

acquiring a gloss corresponding to colored ink data for each pixel;

using, when the acquired gloss is higher than a predetermined target value, a colorless ink having a lower refractive index of a plurality of types of colorless inks in the pixel; and using, when the gloss is not more than the target value, a colorless ink having a higher refractive index in the pixel.

11. An image forming apparatus, which forms an image using a plurality of colors of colored inks which contain pigment color materials and a plurality of types of colorless inks which contain colorless materials and have different refractive indices, comprising:

acquisition means for acquiring, for each pixel in inputted image data, colored ink data for each colored inks;

acquisition means for acquiring a glossiness corresponding to the colored ink data;

forming means for forming an image represented by the inputted image data using, among the plurality of types of colorless inks, a colorless ink having a lower refractive index if the glossiness of the pixel is higher than a predetermined target value, and a colorless ink having a higher refractive index if the glossiness of the pixel is not higher than the predetermined target value.

12. A non-transitory computer-readable storage medium storing a program for controlling a computer apparatus to function as an image forming apparatus of claim 11 when the program is executed by the computer apparatus.

13. An image forming method in an image forming apparatus, which forms an image using a plurality of colors of colored inks which contain pigment color materials and a plurality of types of colorless inks which contain colorless materials and have different refractive indices, comprising:

an acquiring step of acquiring, for each pixel in inputted image data, colored ink data for each colored inks;

an acquiring step of acquiring a glossiness corresponding to the colored ink data;

an forming step of forming an image represented by the inputted image data using, among the plurality of types of colorless inks, a colorless ink having a lower refractive index if the glossiness of the pixel is higher than a predetermined target value, and a colorless ink having a higher refractive index if the glossiness of the pixel is not higher than the predetermined target value.

* * * * *